United States Patent [19]
Roberts et al.

[11] Patent Number: 5,801,858
[45] Date of Patent: Sep. 1, 1998

[54] OPTICAL TRANSMISSION SYSTEMS USING OPTICAL AMPLIFIERS AND WAVELENGTH DIVISION MULTIPLEXING

[75] Inventors: Kim Byron Roberts, Herts, Great Britain; Maurice Stephen O'Sullivan; Gregory Dean May, both of Ottawa, Canada

[73] Assignee: Northern Telecom Limited, Ottawa, Canada

[21] Appl. No.: 669,929

[22] Filed: Jun. 25, 1996

[51] Int. Cl.⁶ .............................. H04B 10/17; H04J 14/02
[52] U.S. Cl. .................... 359/114; 359/124; 359/179; 359/349
[58] Field of Search .............................. 359/114, 124, 359/127, 134, 174, 179, 349

[56] References Cited

U.S. PATENT DOCUMENTS

| | | | |
|---|---|---|---|
| 5,280,549 | 1/1994 | Barnard et al. | 359/114 |
| 5,337,175 | 8/1994 | Ohnsorge et al. | 359/179 |
| 5,452,124 | 9/1995 | Baker | 359/127 |
| 5,548,438 | 8/1996 | Delavaux | 359/341 |
| 5,604,627 | 2/1997 | Kohn | 359/341 |
| 5,633,741 | 5/1997 | Giles | 359/179 |

FOREIGN PATENT DOCUMENTS

| | | |
|---|---|---|
| 0 445 364 A2 | 9/1991 | European Pat. Off. . |
| 0 617 527 A1 | 9/1994 | European Pat. Off. . |
| WO 94/13076 | 6/1994 | WIPO . |

OTHER PUBLICATIONS

Hill, G. R. et al., "Wavelength Routing for Long Haul Networks," IEEE International Conference on Communications, Boston, MA, vol. 2 of 3, pp. 734–738 (Jun. 11, 1989).

Elrafaie, A. F., "Multiwavelength Survivable Ring Network Architectures," IEEE International Conference on Communications '93, Geneva, Switzerland, vol. 2 of 3, pp. 1245–1251 (May 23, 1993).

Wu, Tsong–Ho, "Fiber Network Service Survivability," Artech House, pp. 76–78 (1992).

*Primary Examiner*—Leslie Pascal
*Attorney, Agent, or Firm*—Foley & Lardner

[57] ABSTRACT

The invention provides a method and system for transmitting very high bit rates over an optical link, using unidirectional and bidirectional WDM technology. The 1550 nm window for optical transmission is spatially separated into two bands, "Red" and "Blue", and the channels in each band are selected so that respective wavelengths present a substantially equal gain tilt. A fiber amplifier designed according to spatial separation and wavelength selection of the invention is disclosed, along with multiple span WDM network topologies.

13 Claims, 11 Drawing Sheets

OPTICAL TRANSMISSION SYSTEMS USING OPTICAL AMPLIFIERS AND WAVELENGTH DIVISION MULTIPLEXING

BACKGROUND OF THE INVENTION

1. Field of the Invention

The invention is directed to optical transmission systems and methods for transmission of information over optical networks, and more particularly to optical transmission systems and methods that use optical amplifiers and wavelength division multiplexing.

2. Background Art

The performance of standard reach optics limits the spacing between the line terminating equipment (LTE) and regenerating equipment to approximately 80 km (20 dB at 0.25 dB/km) on non-dispersion shifted or dispersion shifted optical fiber. The 80 km limitation is caused by physical degradation of the transmitted optical signal due to optical dispersion and optical attenuation. The dispersion and attenuation limits, respectively, can both be extended to beyond 80 km with the introduction of external modulation, use of dispersion shifted optical fiber, optical amplifier technology and wavelength division multiplexing (WDM) technology.

When designing multiband transmission systems, three significant issues to consider are the number of amplifiers required (1), gain tilt (2), and protection (3).

(1) Optical amplifiers are expensive units and so the number and types of units required to implement a given data connection is an important design parameter for an optical network.

There are three general types of optical amplifiers: post-amplifiers that connect to a transmitter to boost the output power; line amplifiers that amplify along the route; and preamplifiers that improve the sensitivity of optical receivers. These different types of amplifiers provide different output powers, use different input power levels, and generally have different noise figure requirements.

One way of reducing the number of optical amplifiers is to use the wavelength division multiplexing (WDM) technology. Use of the WDM technology reduces the strands of optical fiber cable needed to establish a communication link, and it can provide manifold capacity expansion on existing fiber links. Its potential for routing signals is equally important.

For example, the WDM filters perform the function of coupling the pump source laser wavelength to the erbium doped fiber. Three-port WDM filters are currently used to couple multiple wavelengths into and out of the transmission fiber.

A four-port WDM coupler for implementing a bidirectional optical amplifier module using a unidirectional optical amplifier is disclosed in U.S. Pat. No. 5,452,124 (Baker, issued Sep. 19, 1995 and assigned to Williams Telecommunications Group).

Isolators are also equipment used in WDM systems, and they function to allow an optical signal to pass in a single direction. If optical isolators are used internal to an optical amplifier, then they make the amplifier an inherently unidirectional device. It is known to use isolators inside gain regions of an optical amplifier. U.S. Pat. No. 5,280,549 (Barnard et al, issued on Jan. 18, 1994 and assigned to National Research Council of Canada) discloses a frequency dependent optical isolator which allows signals to pass in one direction only, so that two signals may be isolated according to their frequencies.

(2) The use of erbium doped fiber amplifiers (EDFA) for multichannel, bidirectional transmission is current practice. Of great importance in network applications is the configuration of the optical amplifier and what signal wavelength to use in conjunction with the pump wavelength. Because the amplifier gain is not perfectly flat for all incoming wavelengths, the precise wavelengths to use is a function of the gain variations of the different available pumps. Gain tilt is a significant issue to consider when designing multiband transmission systems. Gain tilt measures the change in the profile of the gain for each transmission channel at the actual value of the gain of the amplifier module, with respect to the gain profile at the nominal value of the gain, i.e. at the value for which the amplifier is designed. In other words, the gain tilt function varies with link loss. This function depends only on the physics of the dopant in the host fiber glass, and is of interest when signals of more than one channel or direction share the same fiber.

No chemical solutions have yet been found for addressing the gain tilt problem. Dopants, fluoride, etc. can help flatten the gain profile, but do not solve the tilt. Electronic solutions are currently under investigation.

One solution is "gain clamping", which means maintaining the amplifier gain constant on all channels with an idler or lasing. However, this solution requires use of twice the number of laser pumps to provide the necessary extra photons.

Another solution is "loss padding", which implies tuning the loss of each span to match the nominal value for the amplifier or, in other words, to operate all amplifiers of the link at their nominal gains. This solution has the disadvantage of requiring attenuators to be placed in each span, and is not very robust in the presence of variations in losses and optical powers in the system over time and temperature.

"Gain clamping" methods combined with "loss padding" slightly improve the system's robustness, at the price of much more expensive pump lasers.

Another solution to address the gain tilt problem is to use an adjustable optical filter. The relative loss between different wavelengths could then be adjusted by a mechanical or electrical control. The best location for such a filter is inside the amplifier. The filter requires adjustability in the field or, better yet, to be continuously controlled by measuring each wavelength power level. These filters may become more affordable in a few years, but they are currently very expensive and therefore not used.

The prior art fails to provide cost effective solutions for amplification of bidirectional multi-channel optical signals. In addition, effective implementation of four-port WDM filters is difficult because of the loss introduced by the filter, gain tilt and protection problems. The prior solutions and configurations are not concerned with control of the gain tilt or with protection of transmission in multi-channel amplifiers.

(3) To ensure the desired availability of network connections is maintained, it is standard practice in the telecommunication industry to implement redundant equipment so that should one unit fail, another can be rapidly switched into place. This is called protection switching. The number and the type of amplifiers that need to be held as replacement units is also important. Reducing the number of different types of equipment in a network reduces the number of types of spare units and, through standard sparing statistics, significantly reduces the total number of spare units that the network operator must purchase and have readily at hand.

Four general types of protection switching are known: "1+1" protection, whereby one set of equipment protects another set of equipment on a matched pair basis; "1:N" protection, whereby one set of equipment protects N other sets; "ring" protection; and "cross-connect" protection.

Protection protocols can be configured as "bidirectional switching" and "unidirectional switching". The protection protocol has nothing to do with the direction of transmission on the fiber; it is just the switching protocol type. Telecommunication traffic may be bidirectional in nature, as for example, voice circuits, or unidirectional, as for example, CATV signals. Bidirectional traffic means that the data is transmitted in both directions. Bidirectional also means that while a given circuit is interrupted in one direction, there is minimal penalty to interrupt the other direction of the same circuit.

A unidirectional protection switch switches only one direction of a circuit, namely, that direction requiring protection if only one direction is degraded. In contrast, a bidirectional protection switch tries to switch both directions together in all cases.

A ring topology with "1+1" protection offers significant advantages in comparison with a linear, or "1:N" topology. When more than one wavelength is carried by one optical amplifier and only one signal at a time can be protected, such as in a "1:N" system, then when that amplifier fails some of the signals will not be protected. This severely impairs the availability of circuits carried within those signals. The methods below allow signals with multiple wavelengths through one amplifier to be efficiently protected.

Electrical, and soon optical, cross-connects can implement the above and more general protection or restoration topologies. However, cross-connects are not generally as fast to protect as transmission equipment implementing the above three protection methods, and are therefore generally used to implement restoration rather than protection.

SUMMARY OF THE INVENTION

It is an object of the present invention to provide multiple wavelength transmission systems with optical amplifiers and wavelength division multiplexing, which reduce or alleviate some or all of the drawbacks encountered with the prior art solutions.

It is another object of this invention to provide an improved approach to the design of multi-channel transmission systems for allowing multiple wavelengths to be amplified by the same optical amplifier and transmitted over the same optical fiber.

Still another object of this invention is to provide multiple wavelength systems with a reduced number of amplifiers and other optical components such as dispersion compensation modules, which allows the system to tolerate more loss from the outside plant fiber cable.

Yet another object of the invention is to provide multiple wavelength systems with a reduced number of optical components which implicitly require a reduced number of spare components for protection facilities.

Accordingly, the invention is directed to a wavelength division multiplexing (WDM) optical amplifier module comprising a first peripheral gain region for amplifying a first multi-channel optical signal; first splitter means connected to the first peripheral gain region for spatially separating the first multi-channel optical signal into a first band optical signal and a second band optical signal according to the wavelength; a central gain region for receiving the first band optical signal and the second band optical signal, separately amplifying same, and providing an amplified first band optical signal and an amplified second band optical signal; second splitter means for recombining the amplified first band optical signal with the amplified second band optical signal into a second multi-channel optical signal; and a second peripheral gain region connected to the second splitter means for amplifying the second multi-channel optical signal.

According to another aspect, the invention comprises an optical bidirectional regenerator for multi-channel telecommunication using wavelength division multiplexing, comprising first splitter means for spatially separating a first multi-channel optical signal into a first band optical signal and a second band optical signal according to the wavelength; a bidirectional regenerator module for receiving the first band optical signal and the second band optical signal from the first splitter means, separately amplifying same, and providing an amplified first band optical signal, and an amplified second band optical signal; and second splitter means for recombining the amplified first band optical signal with the amplified second band optical signal into a second multi-channel optical signal.

The invention also provides a method for transmitting multi-channel optical signals between a first and a second site connected by an optical transmission path including a fiber amplifier, comprising the steps of spatially separating the gain region of the fiber amplifier into a first gain region and a second gain region; associating the first gain region with a first transmission band and the second gain region with a second transmission band; transporting a first optical signal in the first transmission band; and transporting a second optical signal in the second transmission band.

In addition, the invention provides for a method for transmitting multi-channel optical signals between a first and a second node of a transmission link comprising the steps of defining a first transmission band associated with a first direction of transmission and a second transmission band associated with the opposite direction of transmission; transferring, between the first node and a first end of a fiber span, a first multi-channel optical signal comprising a first optical signal $S1_m$, where m∈[1,M] and M is an integer, in the first transmission band, and a second optical signals $S2_k$, where k∈[1,K] and K is an integer, in the second transmission band; spatially separating on the fiber span the first optical signal $S1_m$ along a first unidirectional route, and the second optical signal $S2_k$ along a second unidirectional route, in accordance with the wavelength; separately amplifying the first optical signal $S1_m$ and the second optical signal $S2_k$; and combining the first optical signal and the second optical signal to form a second multi-channel optical signal and transferring same between the transmission link and the second node.

A major advantage of the optical transmission systems according to this invention is that multiple wavelengths may be implemented in the 1550 nm window of the band of an Erbium doped fiber amplifier (EFDA) without severe gain tilt impairments. This allows reduction of the number of different types of equipment in a network, which in turn reduces the number of types of spare units, and through standard sparing statistics, significantly reduces the total number of spare units that the network operator must purchase and have readily at hand.

For example, four channels per direction may be supported with a configuration using spatial separation and WDM wavelength choice according to this invention.

Another major advantage of the optical transmission systems according to this invention is that reduced fiber counts need to be used for deploying such systems, which is especially important when there is a lack of fibers on a given route. As a result, transmission systems according to this invention also reduces the system cost, when more than two wavelengths are amplified per amplifier. The reduced impact of the loss of the other optical components allows the system to tolerate more loss from the outside plant fiber cable.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

Figure 1A:
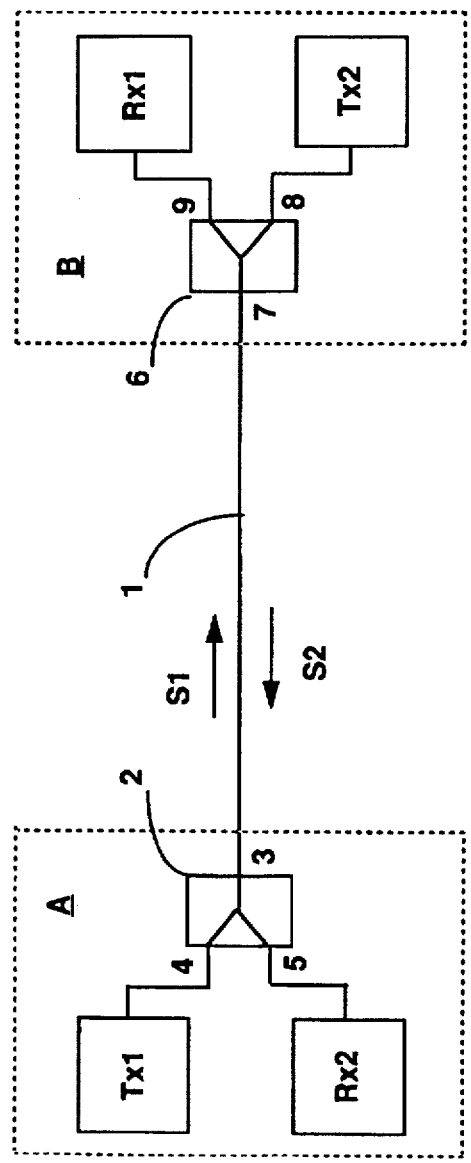
FIG. 1A shows a configuration of a transmission system using three-port WDM splitters.

WDM couplers or splitters are filters used to separate or combine optical signals according to their wavelength. For example, a WDM coupler is used to couple the light from the laser source into the gain region of an EDFA. These couplers are very useful in multi-channel optical systems, however, the isolation requirements in the WDM could be a severe issue due to the multi-path interference from imperfect isolation of the splitters. Three-port conventional WDM couplers may be used in a configuration as illustrated in the example of FIG. 1A. FIG. 1A shows a bidirectional connection between sites A and B where channels of wavelengths $\lambda_1$ and $\lambda_2$ use the same fiber 1. WDM splitter 2 at site A connects transmitter Tx1 to fiber 1 through ports 4 and 3, for launching optical signal S1 of wavelength $\lambda_1$ on fiber 1. WDM splitter 2 also connects fiber 1 to receiver Rx2 through ports 3 and 5, for directing optical signal S2 of wavelength $\lambda_2$ from fiber 1 to receiver Rx2. Similarly, WDM splitter 6 is connected with port 7 to fiber 1 and with port 8 to transmitter Tx2 for launching optical signal S2 on fiber 1, while port 9 is connected to receiver Rx1 for directing the optical signal S1 from fiber 1 to receiver Rx1.

Figure 1B:
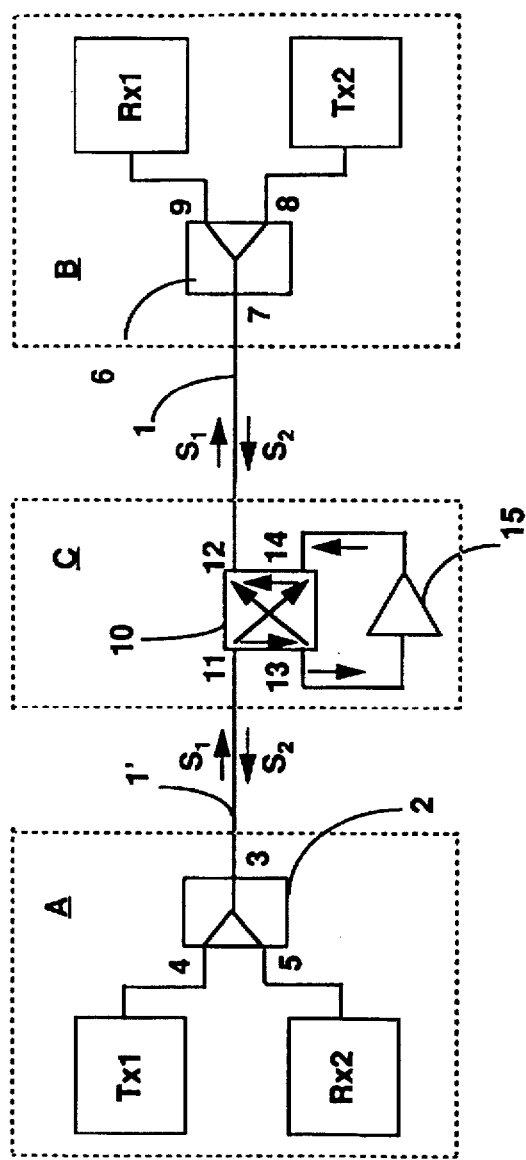
FIG. 1B shows a configuration of a transmission system using a four-port WDM splitter.

The four-port filter disclosed in the previously identified U.S. Pat. No. 5,452,124 (Baker) may be used for obtaining bidirectional amplification using a unidirectional amplifier. A bidirectional system configuration using such a four-port WDM splitter is illustrated in FIG. 1B. Sites A and B have a similar configuration with that of FIG. 1A. Optical signal S1 of wavelength $\lambda_1$ travels from site A to site B, while optical signal S2 of wavelength $\lambda_2$ travels in an opposite direction of propagation, namely from site B to site A. The four-port WDM splitter 10 is provided at a site C, together with a unidirectional optical amplifier 15. Splitter 10 routes the traffic so that both channels have the same direction in the gain portion of the amplifier 15. Thus, signals S1 and S2 received at ports 11 and 12, respectively, are routed in the same direction to exit at port 13, which is connected to the input port of optical amplifier 15. The amplified signals S1 and S2 arrive at port 14 of the WDM filter 10 in the same direction of transmission and are launched on fiber 1 in the appropriate direction, according to the wavelength $\lambda_1$ or $\lambda_2$.

Figure 2A:
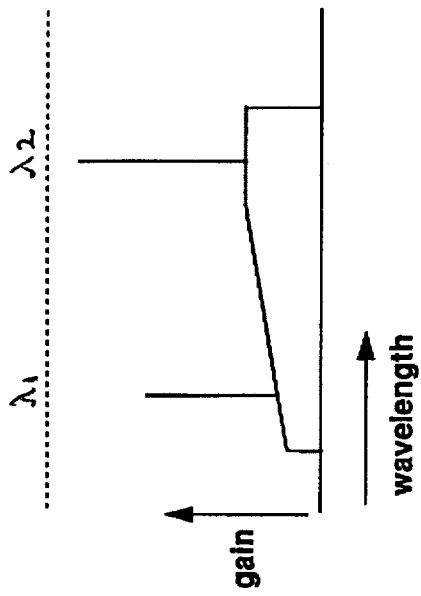
FIG. 2A shows the gain for two channels when the amplifier operates at the nominal gain.
Figure 2B:
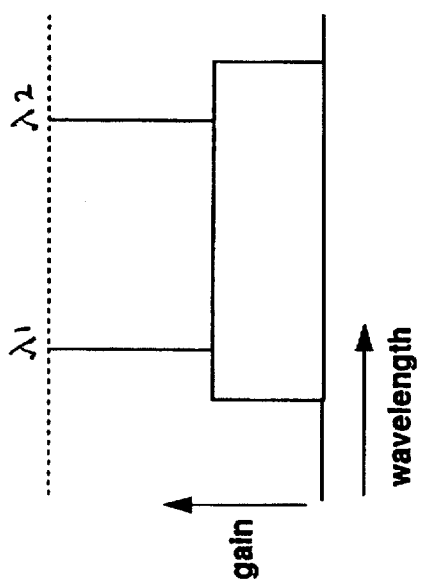
FIG. 2B illustrates the gain for the two channels of FIG. 1A when the amplifier module operates at a gain lower than the nominal gain.

The number of channels and the wavelength of each channel are important design parameters for optical transmission systems. It has been noted that the gain of an optical amplifier changes when the power at the input is different (lower or higher) than the nominal power for which the amplifier was designed. This change in the gain with the input power, defined as "gain tilt", is also dependent on the channel wavelength. As an example, FIG. 2A shows the gain of transmission channels 1 and 2 when the amplifier module operates at the nominal gain. FIG. 2B shows the changes in the gain of channels $\lambda_1$ and $\lambda_2$ when the actual value of the gain is lower than the nominal value. Operating at a higher gain would produce a profile with the opposite slope.

Figure 2C:
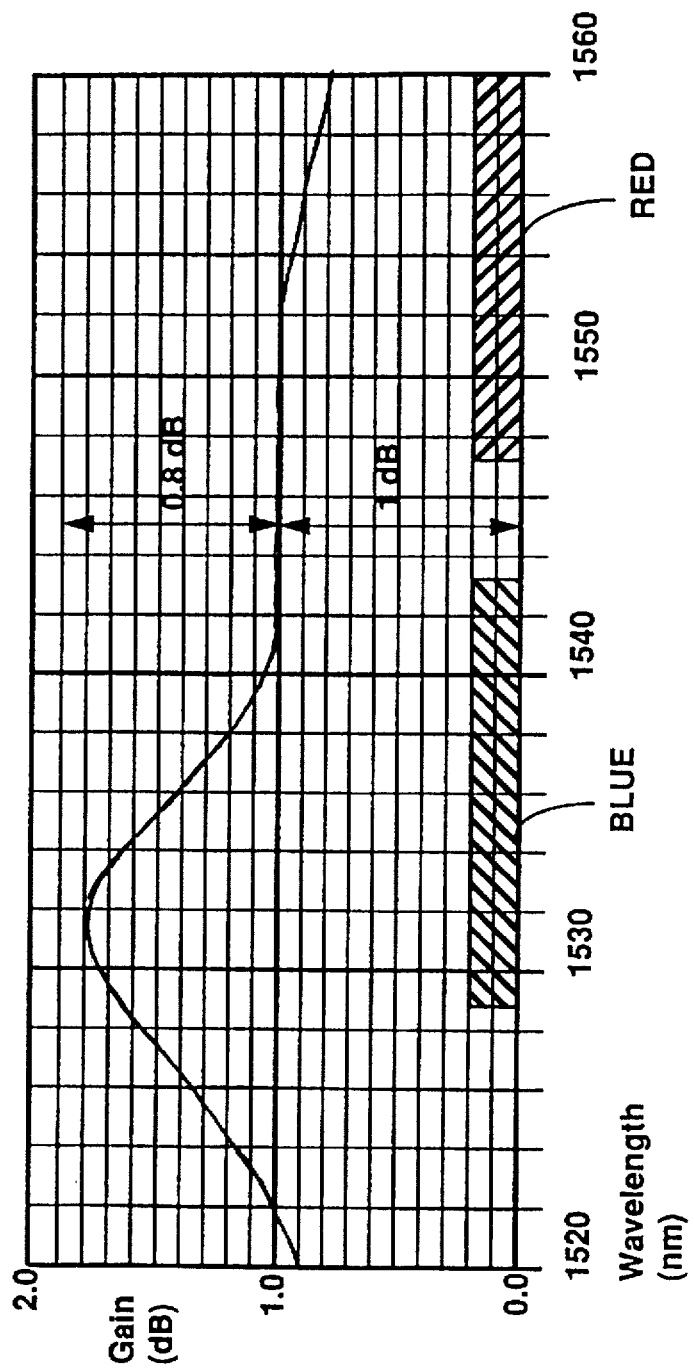
FIG. 2C is a schematic graph showing the gain tilt per dB of gain change for the bands of interest.

Today's optical amplifier technology works well for single wavelength amplification. However, the gain curve across the 1550 nm passband of installed, non-dispersion fiber is not flat, especially in the 1530 to 1542 nm range. FIG. 2C shows the change in gain at each wavelength if the gain at 1545 nm is increased by 1 dB. For example, the gain at 1532 nm would go up 1.8 dB for each 1.0 dB increase at 1545 nm. This is 1.8−1.0=0.8 dB of tilt/dB of change in span loss.

WDM is not generally used in the 1530–1542 nm range because of the gain peak with silica-based EDFAs which causes per-channel output power to vary greatly in this region and seriously affects signal gain outside this region when several amplifiers are cascaded. The current solutions to address this problem include selectively varying the input power for each channel, or staying in the region of flat gain. The first solution causes a significant reduction of the output power of the individual channels, and makes the span engineering difficult. The second solution limits the number of channels that can be multiplexed, and also prevents the reuse of the large embedded base of OC-48 transmitters, without the addition of expensive wavelength adapters.

According to this invention, the optical amplifier gain region of about 1528 nm to 1560 nm is split into two bands: "Blue" for 1528 to 1543 nm, and "Red" for 1547 to 1560 nm. The two bands are spatially separated for amplification. The wavelength within a band is chosen to be in the regions of similar gain tilt, or to have minimum variation of the gain tilt/dB in the respective "Red" or "Blue" band. This is especially important for the "Blue" gain region, which has large variations in gain tilt, as shown in FIG. 2C.

Figure 3:
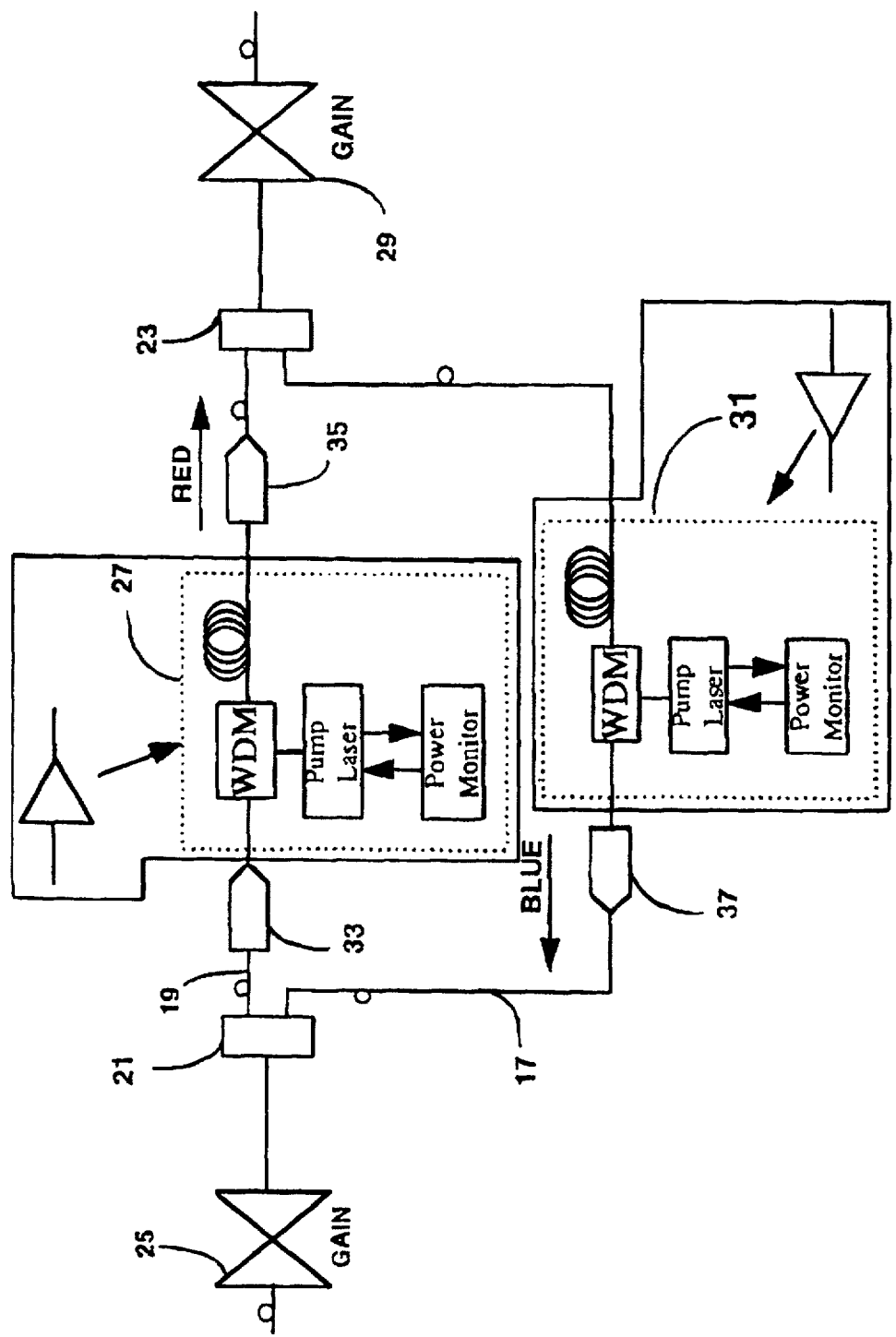
FIG. 3 illustrates a block diagram of an optical amplifier using spatial separation.

FIG. 3 illustrates a block diagram of a bidirectional fiber amplifier, as an example an erbium doped fiber amplifier (EDFA) 15 using spatial separation according to this invention. In this disclosure, the terms "active optical fiber" and "gain region" designate a length of optical fiber doped with a rare earth element and pumped with coupled waves for amplifying optical signals.

As shown in FIG. 3, the optical signals traveling within the central section of optical amplifier 15 are grouped in two bands, each for a direction of transmission in this example. The traffic in the Red and Blue bands is physically separated on fibers 17 and 19 using a first three-port WDM splitter 21. Signals on fibers 17 and 19 are then recombined by a second three-port WDM splitter 23. As a result, the amplifier has two peripheral gain spans 25 and 29, and two central gain lengths 27 and 31. The signals travel in both directions at the periphery of the amplifier in the gain spans 25 and 29 and in one direction in the central lengths 27 and 31. Isolators 33, 35, and 37 are also provided and oriented so as to obtain bidirectional operation between the bands. Because the "Red" and "Blue" gain lengths are spatially separated, separate power control per direction is preferably used, through separate saturation of gain and through control of separate pump powers. Embodiments of the amplifier module 15 where the signals travel in the same direction may also be designed, in which case separate or common control per band may be used.

This architecture significantly reduces the effect of gain tilt between the two bands and multi-path interference from imperfect isolation of the two splitters. By using different directions in the central region of the EDFA, and also two spatially separated bands, the isolation requirements in the WDM splitters 21 and 23 are achievable. In addition, by separating the bands within the amplifier and providing gain stages outside the separation, the noise figure and output power penalty due to the losses of the WDM couplers are reduced.

The optical fiber exhibits different dispersion characteristics depending on the wavelength used for transmission. For standard single mode fiber, the two main transmission windows of interest are at 1310 nm for non-dispersion shifted optical fiber, and 1550 nm for dispersion shifted optical fiber. When non-dispersion shifted optical fiber is used, the transmitter should preferably be equipped with dispersion compensating modules (DCM) for reducing the significant transmission impairment at high bit rates.

Figure 4:
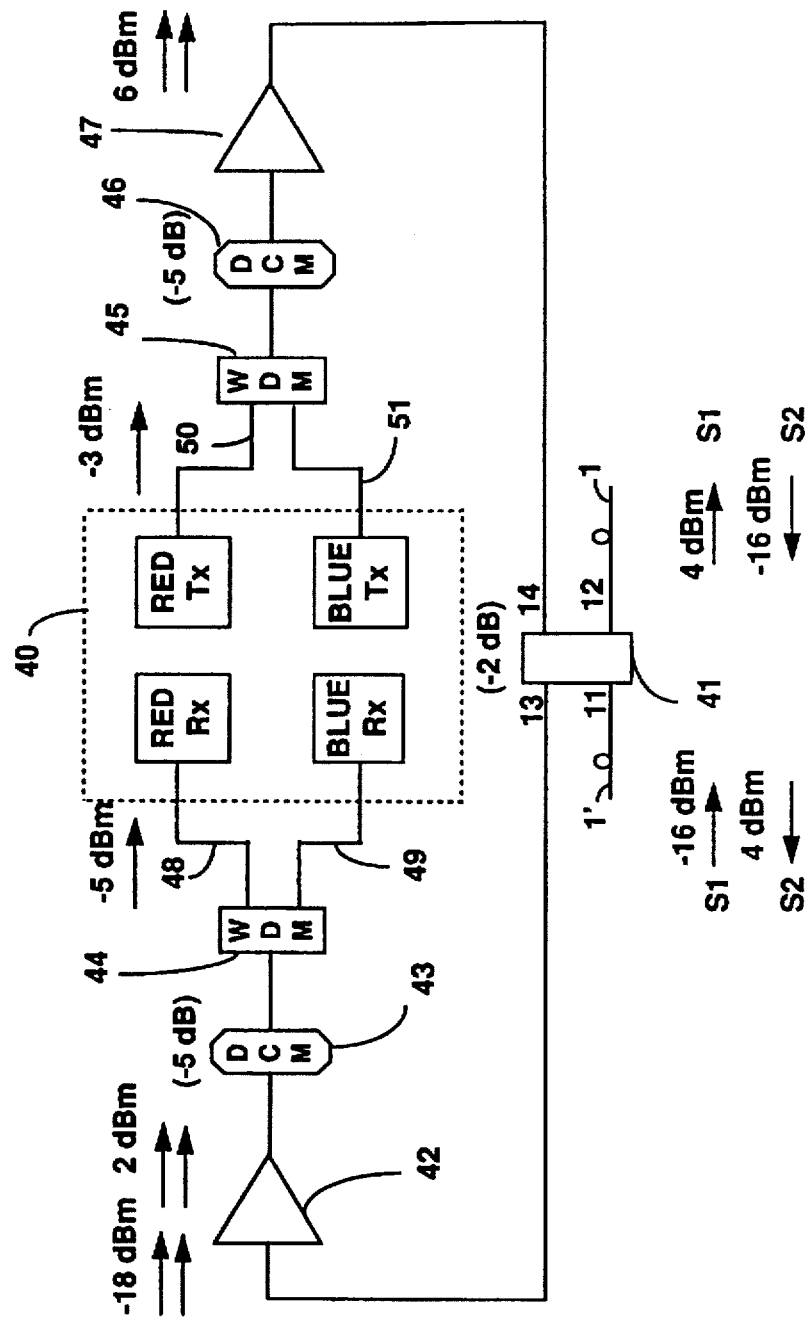
FIG. 4 is a block diagram of a bidirectional regenerator.

FIG. 4 is a block diagram of a bidirectional regenerator built in accordance with the spatial separation method of the invention. Inserting a four-port WDM router 41 into a fiber carrying bidirectional WDM signals separates the incoming signals according to their direction of propagation. The signals in the "Blue" band arrive, for example, at port 11 on fiber 1', and the signals in the "Red" band arrive at port 12 on fiber 1. These signals exit at port 13 and are routed by WDM splitter 41 in the same direction from port 13 to the input of a preamplifier 42, then to a dispersion compensating module 43. A three-port WDM splitter 44 separates the signals according to their wavelength and routes them to receivers Rx1 and Rx2 of block 40. After regeneration or add-drop multiplex functions are performed in block 40, the signals are passed to two transmitters Tx1 and Tx2. From the two transmitters, the signals are combined with a three-port WDM splitter 45, passed through another dispersion compensation module 46 if needed, and then amplified by a post-amplifier 47. The four-port WDM splitter 41 receives the amplified signals at port 14 and inserts these signals into the two fibers in the appropriate directions.

FIG. 4 also illustrates how the configuration compensates for the loss introduced by the WDM couplers and DCMs presently available.

Figure 5:
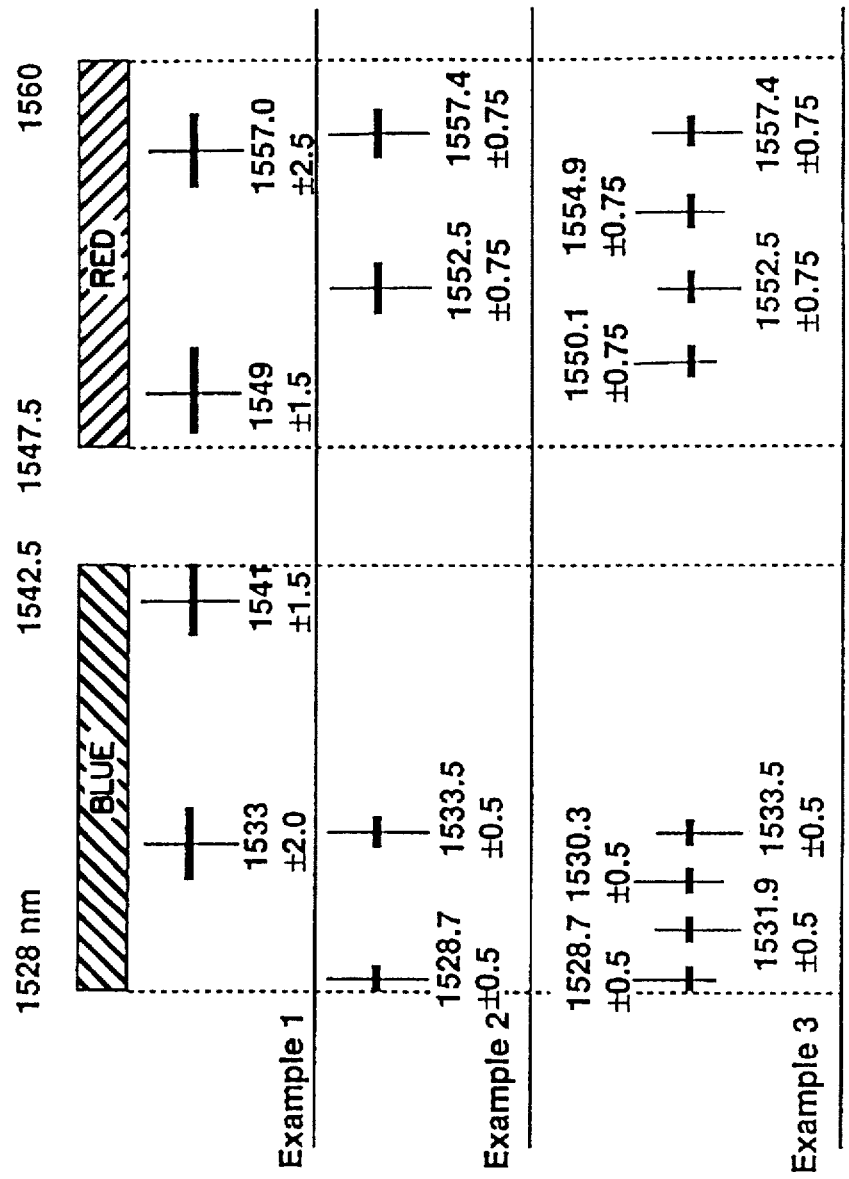
FIG. 5 shows three examples of selection of the wavelength for multi-channel optical transmission systems.

Selection of the wavelengths within the Red and Blue bands is also important in multi-channel systems for further reducing the gain tilt. FIG. 5 shows three examples of selection of the wavelength within a band, for obtaining up to eight wavelengths evenly split between the two directions. In the first example, two channels in the "Blue" band and two channels in the "Red" band are selected. The wavelength of the first "Blue" channel is $\lambda_1=1533$ nm and that of the second "Blue" channel is $\lambda_2=1541$ nm. The wavelength of the first "Red" channel is $\lambda_3=1549$ nm and that of the second "Red" channel is $\lambda_4=1557$ nm. The difference in gain tilt for the two "Blue" channels is relatively large, and it is shown in FIG. 2C at 0.65, while the difference in gain tilt for the two "Red" channels is 0.1. A gain tilt of 0.65 will cause problems in the system.

The second example shows another selection with two channels in the "Blue" band and two channels in the "Red" band. The wavelength of the "Blue" channels is $\lambda_1=1528.7$ nm and $\lambda_2=1533.5$ nm having approximately the same gain tilt of 1.75. The wavelength of the "Red" channels is $\lambda_3=1552.5$ nm and $\lambda_4=1557.4$ nm having a difference in gain tilt of approximately 0.1, and thus very little difference. This small gain tilt will not cause problems in the system of this example, because the wavelengths of the channels were selected to have a matched gain tilt.

The third example shows a system with eight channels, with four channels in the "Blue" band and four channels in the "Red" band. The wavelength of the "Blue" channels is $\lambda_1=1528.7$ nm, $\lambda_2=1530.3$ nm, $\lambda_3=1531.9$ nm and $\lambda_4=1533.5$ nm, having a variation in the gain tilt of a maximum of 0.1. The wavelength of the "Red" channels is $\lambda_5=1550.1$ nm, $\lambda_6=1552.5$ nm, $\lambda_7=1554.9$ nm and $\lambda_8=1557.4$ nm, with a difference in gain tilt of approximately 0.1.

This method of selection of the wavelength of a transmission channel allows multiple wavelengths to be amplified in the Blue band of an erbium doped fiber amplifier without severe gain tilt impairments.

In addition, active equalization between wavelengths may also be obtained by adjusting the transmitted power and also by providing in-line equalization devices when they become available.

If multiple channels are transmitted on a single fiber span and amplified in the same module or modules, the number of amplifiers, fiber spans, and other optical components between two terminals can be minimized. There are several ways of achieving this reduction in fiber spans and amplifiers based on spatial separation of the transmission bands according to the direction of propagation, and on the proper selection of signal wavelength. Some examples will be presented in the following.

A receiver typically requires −5 dBm of optical power and overloads at 0 dBm, and a transmitter is typically required to launch into the outside plant fiber +7 or +10 dBm. These design parameters make it difficult or impossible to design an optical amplifier which simultaneously operates as a pre- and post-amplifier. In addition, these requirements are aggravated by the presence of gain tilt. To obtain these power levels, the current transmitters are provided with an optical amplifier configured as a post-amplifier and the receivers are provided with an optical amplifier configured as a pre-amplifier.

However, a single fiber amplifier may operate simultaneously as a pre- and post-amplifier according to this invention, by providing separate power control per direction and selecting the wavelength of the channels for minimizing the gain tilt.

Figure 6:
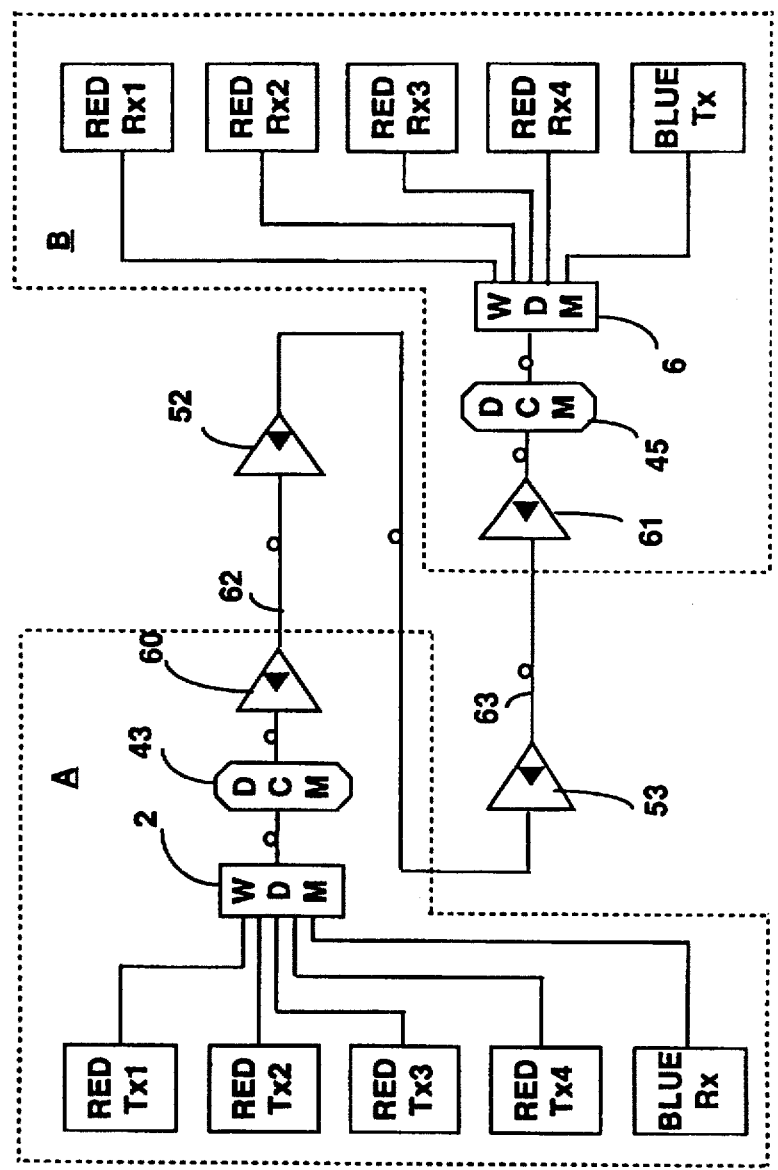
FIG. 6 is a multiple span optical transmission system configuration using common pre/post WDM amplification modules.

FIG. 6 shows a configuration with bidirectional amplifiers operating as line amplifiers and as combined pre- and post-amplifiers. In this configuration, there are four signals, $\lambda_1$, $\lambda_2$, $\lambda_3$ and $\lambda_4$, in the "Red" band, and one signal, $\lambda_5$, in the "Blue" band. The DCM 43 and the WDM splitter 2 at site A are separated from the optical cable 62 by the gain of the pre/post-amplifier 60. Similarly, the DCM 45 and the WDM splitter 6 at site B are separated from the optical cable span 63 by the gain of the pre/post-amplifier 61. This reduces the impact of the optical loss of these components on noise and on power level.

Optical amplifiers 60 and 61 are provided with separate power control per direction, so that amplifier 60 operates as post-amplifier for transmitters Tx1–Tx4 and as pre-amplifier for receiver Rx. Similarly, amplifier 61 operates as a pre-amplifier for receivers Rx1 to Rx4 and as a post-amplifier for transmitter Tx.

Appropriate selection of wavelength combined with the spatial separation of the channels according to this invention, allows for further simplification of the configuration of a multi-channel system. Thus, if the number of transmission channels in one direction equals the number of channels in the opposite direction, a cost effective network may be obtained by reducing the number of protection links.

Figure 7A:
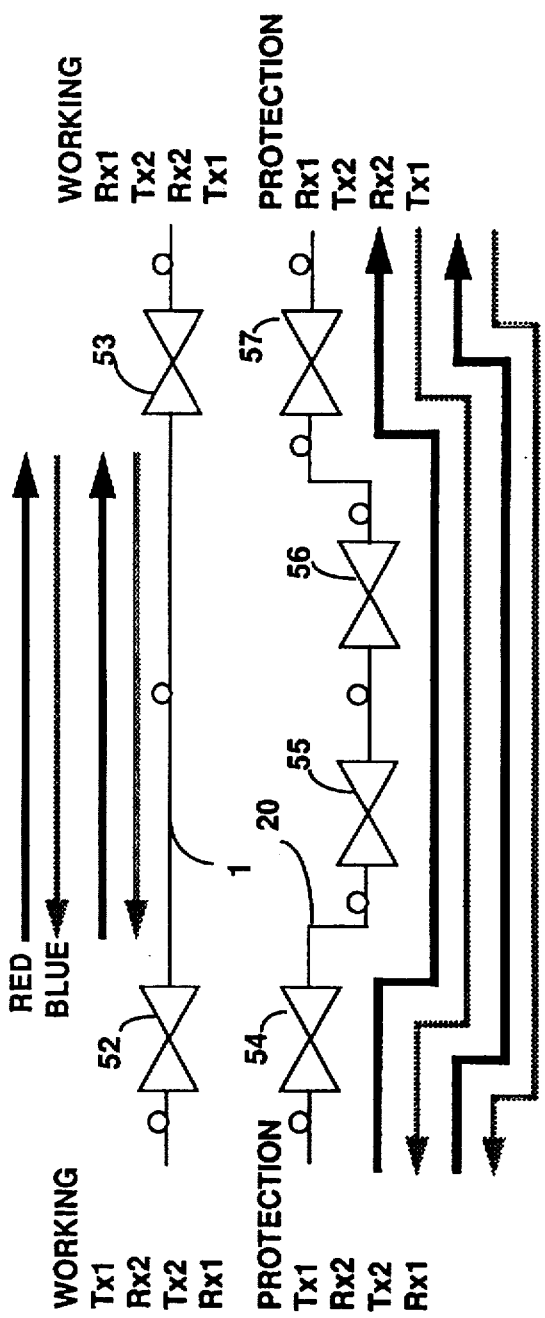
FIG. 7A is a paired optical transmission system showing the economy in the fiber spans for working and protection links of a 1:1 linear configuration.
Figure 7B:
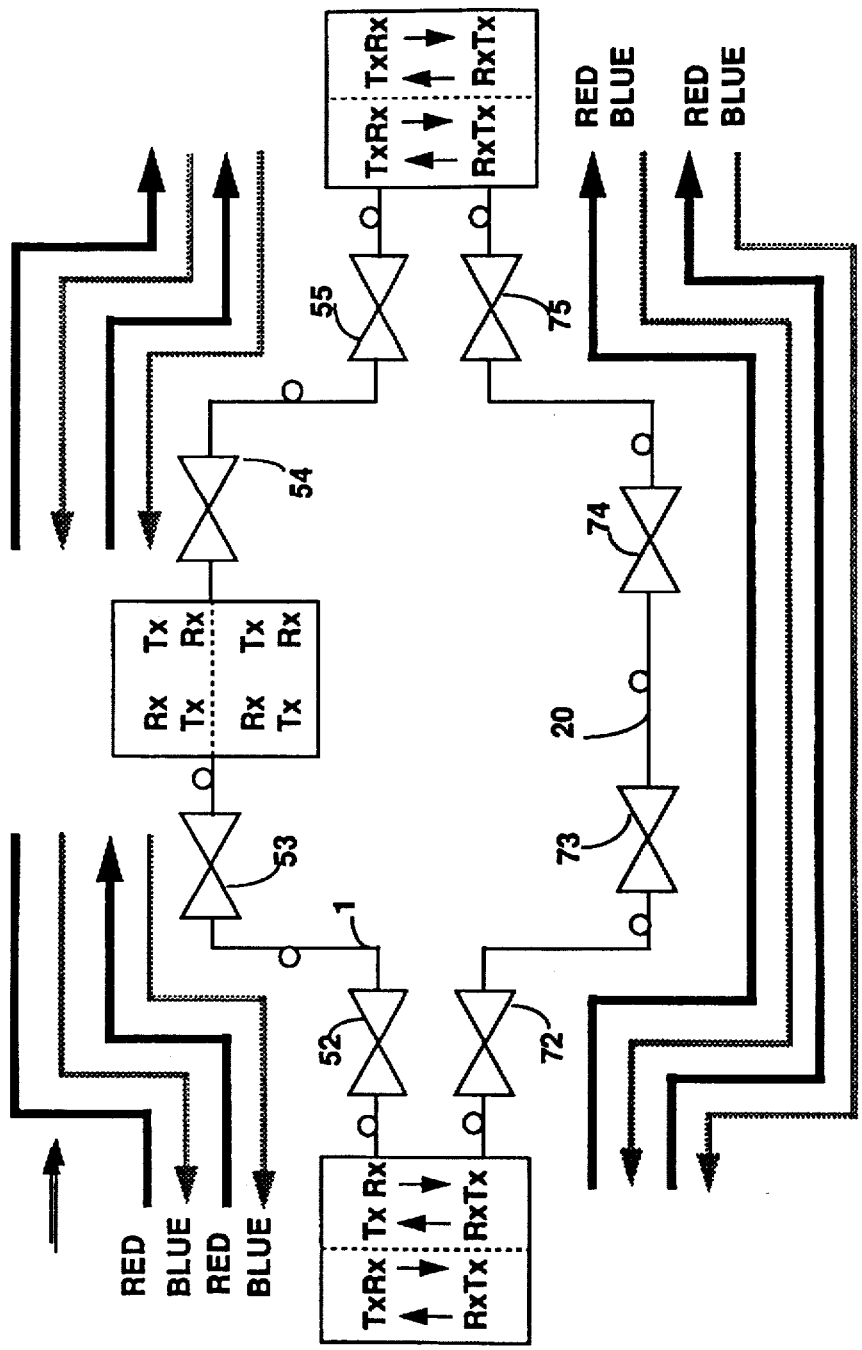
FIG. 7B illustrates paired two-stacked, two fiber rings using WDM amplifier modules.
Figure 7C:
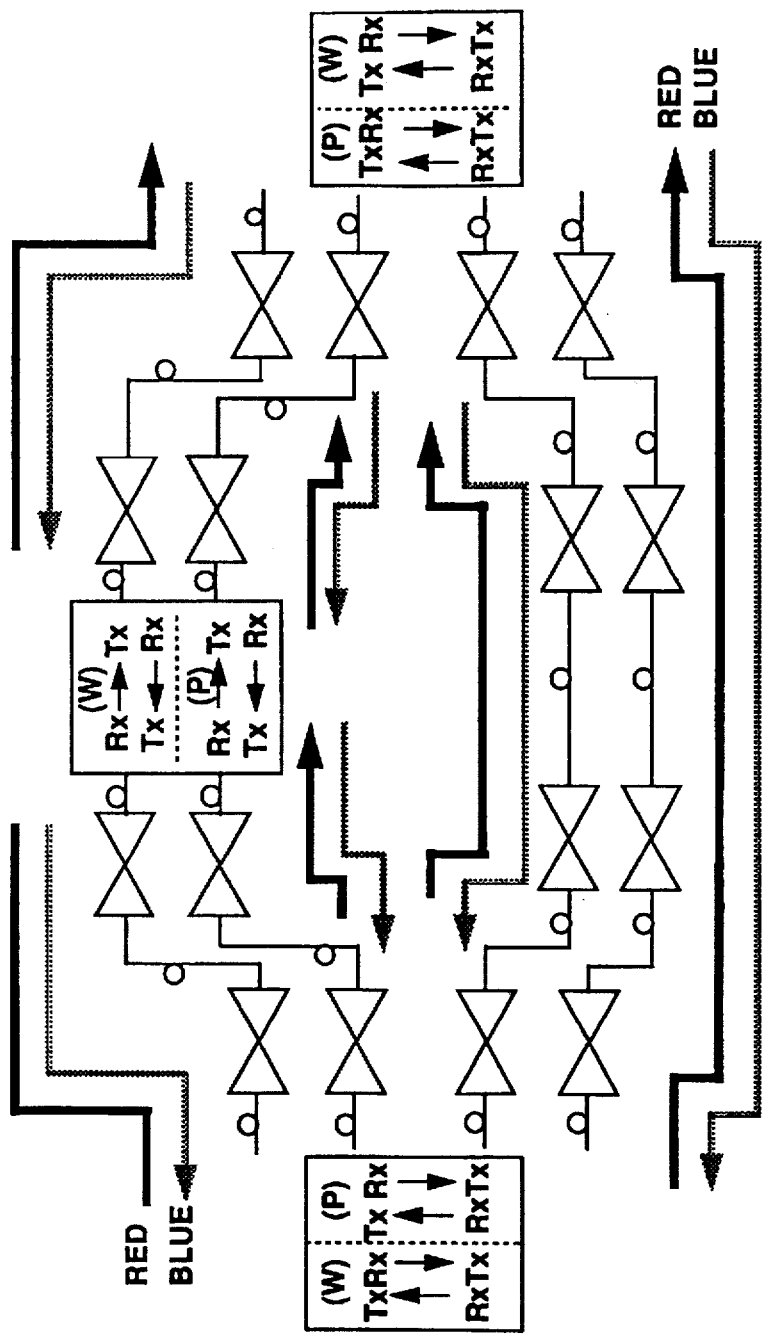
FIG. 7C is a paired four-fiber ring configuration using WDM amplifier modules.

FIGS. 7A, 7B and 7C illustrate systems with an equal number of signals in both bands, here called bidirectional pairing. Thus, for each transmitter-receiver path in one direction, there is a receiver-transmitter path in the opposite direction. This configuration has significant advantages and reduces the number of protection links. With an appropriate flattening filter, a WDM amplifier module as shown in FIG. 3 can be designed to support an equal number of wavelengths in both directions. It is recommended that working and protection groups be provisioned through separate amplifiers in order to prevent exposure to a single amplifier failure.

FIG. 7A is a balanced bidirectional optical transmission system showing the economy in the fiber spans for working and protection links of a linear configuration of a single 1:1 system. One set of amplifiers 52 and 53 is equipped to accommodate the working traffic on fiber 1. The protection traffic takes place on a separate route 20 using amplifiers 54, 55, 56, and 57. No more amplifiers are necessary to support a second 1:1 system since the amplifiers support two "Red" band and two "Blue" band wavelengths. Further systems may be provisioned to use the same fiber and amplifiers, provided that appropriate wavelengths are available and the link budget can be met. Compared to a system that does not use this pairing, such as a unidirectional WDM system, a paired bidirectional system requires fewer channels to carry and protect a given amount of data. Fewer channels means fewer fibers, fewer amplifiers, and fewer terminal electronics required to carry the same data.

FIG. 7B is a configuration of two-stacked, two-fiber rings using WDM amplifier modules as shown in FIG. 3. Because of the bidirectional nature of the amplifiers, only one fiber per span is required to implement a base system. No more amplifiers are thereafter required to implement a second system. Further ring systems can be provisioned to use the same fiber and amplifiers, if appropriate spatial separation and paired wavelength selection are used, as discussed in connection with FIGS. 2C and 5, and the link budget can be met.

FIG. 7C is a four-fiber ring configuration using the WDM amplifier modules. A four-fiber ring may be converted to a "two-fiber ring with span switching". This differs from a normal two-fiber ring in that the four-fiber ring protocol is implemented, allowing such features as span switching.

While the invention has been described with reference to particular example embodiments, further modifications and improvements which will occur to those skilled in the art may be made within the purview of the appended claims, without departing from the scope of the invention in its broader aspect.

What is claimed is:

1. A multi-channel telecommunication system comprising:

(K) first band transmitters at a first site;

(K) first band receivers at a second site;

(M) second band receivers at said first site;

(M) second band transmitters at said second site;

an optical working fiber (W) connecting said first site and said second site for transporting (K) first band optical signals in a forward direction between said (K) first band transmitters at said first site and said (K) first band receivers at said second site and for transporting (M) second band optical signals in a reverse direction between said (M) second band transmitters at said second site and said (M) second band receivers at said first site;

a first splitter element at said first site for routing said (K) first band optical signals from said (K) first band transmitters to a first end of said working fiber (W) and for routing said second band optical signals from said first end to a respective one of said (M) second band receivers, according to wavelength;

a second splitter element for routing said (M) second band optical signals from said (M) second band transmitters to a second end of said optical working fiber (W) and for routing said (K) first band optical signals from said second end to a respective one of said (K) first band receivers, according to wavelength;

a WDM optical amplifier module series connected on said optical working fiber (W) for amplifying said (K) first band optical signals and said (M) second band optical signals, said WDM optical amplifier module series having a first peripheral gain region for amplifying said first band optical signals and said second band optical signals;

a first three-port WDM splitter connected to said first peripheral gain region for spatially separating said first band optical signals from said second band optical signals, according to wavelength;

a central gain region for receiving said first band optical signals and said second band optical signals, separately amplifying same;

a second three-port WDM splitter connected to said central region for spatially separating said first band optical signals from said second band optical signals; and a second peripheral gain region connected to said second three-port WDM splitter for amplifying said second band optical signals.

2. A system as claimed in claim 1, wherein K=M.

3. A system as claimed in claim 2, further comprising a second optical fiber (P) connecting said first splitter element and said second splitter element for protection traffic, for a 1:1 transmission and protection of said first and second band optical signals.

4. A system as claimed in claim 2, further comprising a second optical fiber (P) connecting said first splitter element and said second splitter element for protection traffic, for connecting said first and second sites in a two-fiber switched ring configuration.

5. A system as claimed in claim 2, further comprising a plurality of (N) optical fibers (W) and a second optical fiber (P) connecting said first splitter element and said second splitter element for a 1:N transmission and protection of said first and second band optical signals.

6. A system as claimed in claim 2, further comprising a second optical working fiber (W) and two optical protection fibers (P) connecting said first splitter element and said second splitter element for connecting said first and second sites in a four-fiber switched ring configuration.

7. A method for transmitting multi-channel optical signals between a first and a second node of a transmission link connected over an optical fiber, comprising the steps of:

defining a first transmission band associated with a direction of transmission and a second transmission band associated with the opposite direction of transmission;

selecting (K) forward channels in said transmission band and (M) reverse channels in said transmission band, all said channels having a substantially similar gain tilt/dB;

transferring, between said first node and a first end of said fiber, a first multi-channel optical signal comprising all said (K) forward channels in said first transmission band, and a second multi-channel optical signal comprising all said reverse channels in said second transmission band;

providing a WDM optical amplifier module on said fiber;

at the site of said WDM optical amplifier module, spatially separating said first multi-channel optical signal along a first unidirectional route within said WDM optical amplifier module, and said second multi-channel optical signal along a second unidirectional route within said WDM optical amplifier module, in accordance with the wavelength; and separately amplifying said first multi-channel optical signal and said second multi-channel optical signal in said WDM optical amplifier module.

8. A method as claimed in claim 7, wherein said step of defining comprises selecting said first transmission band in the blue region of the spectrum and selecting said second transmission band in the red region of the spectrum.

9. A method as claimed in claim 7, wherein said step of defining further comprises selecting a first transmission sub-band in said first band and a second sub-band in said second transmission band, each sub-band characterized by a substantially constant gain tilt/dB.

10. A method as claimed in claim 9, wherein all said (K) forward channels of said first multi-channel optical signal are selected in said first sub-band and all said (M) reverse channels of said second multi-channel optical signal are selected in said second sub-band.

11. A method as claimed in claim 9, wherein said first sub-band is defined between 1528 and 1534 nm, and said second sub-band is defined between 1550 and 1558.5 nm.

12. A method as claimed in claim 7, wherein said first transmission band is defined between 1528 and 1543 nm and said second transmission band is defined between 1547 and 1560 nm.

13. A method as claimed in claim 7, wherein said step of amplifying further comprises separately controlling the gain of said multi-channel optical signal and said second multi-channel optical signal.

* * * * *